March 18, 1969  S. H. FRANKEL  3,433,511
JOINT FOR OUTSIDE REAR VIEW MIRRORS
Filed Nov. 21, 1966  Sheet 1 of 2
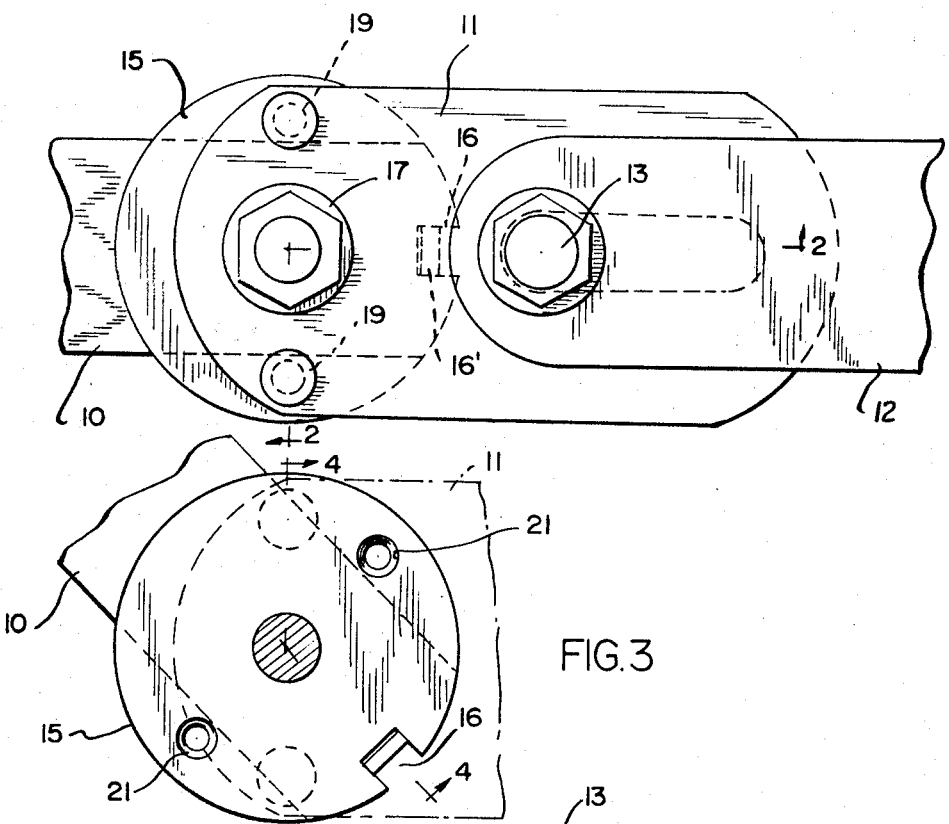
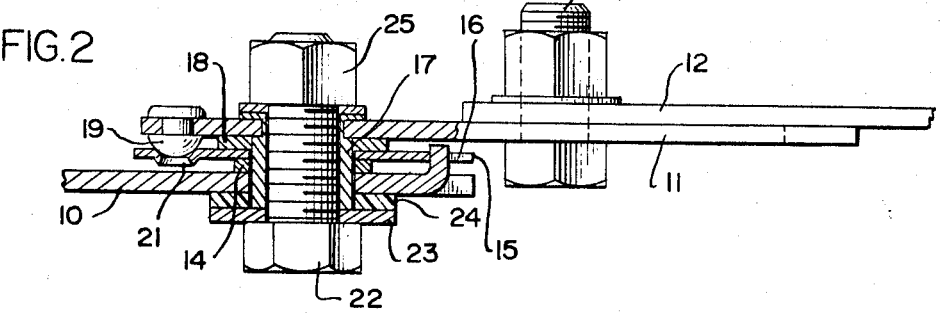
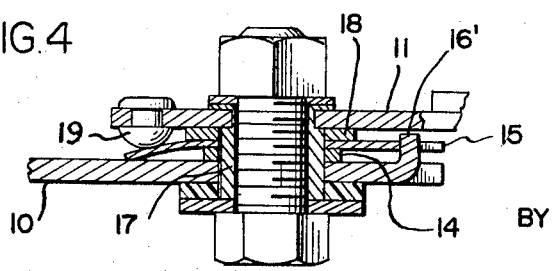
INVENTOR
SAMUEL H. FRANKEL
BY Bair, Freeman & Molinare
ATTORNEYS.

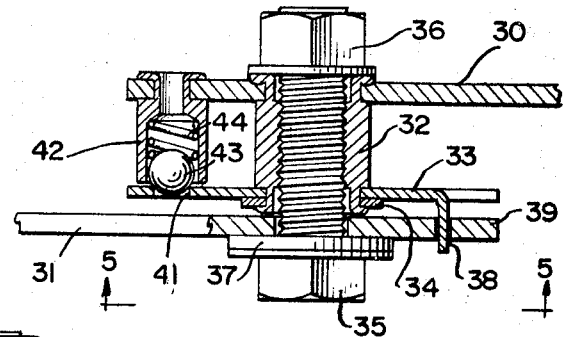
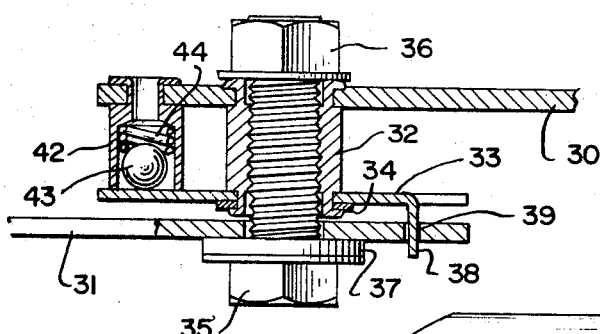
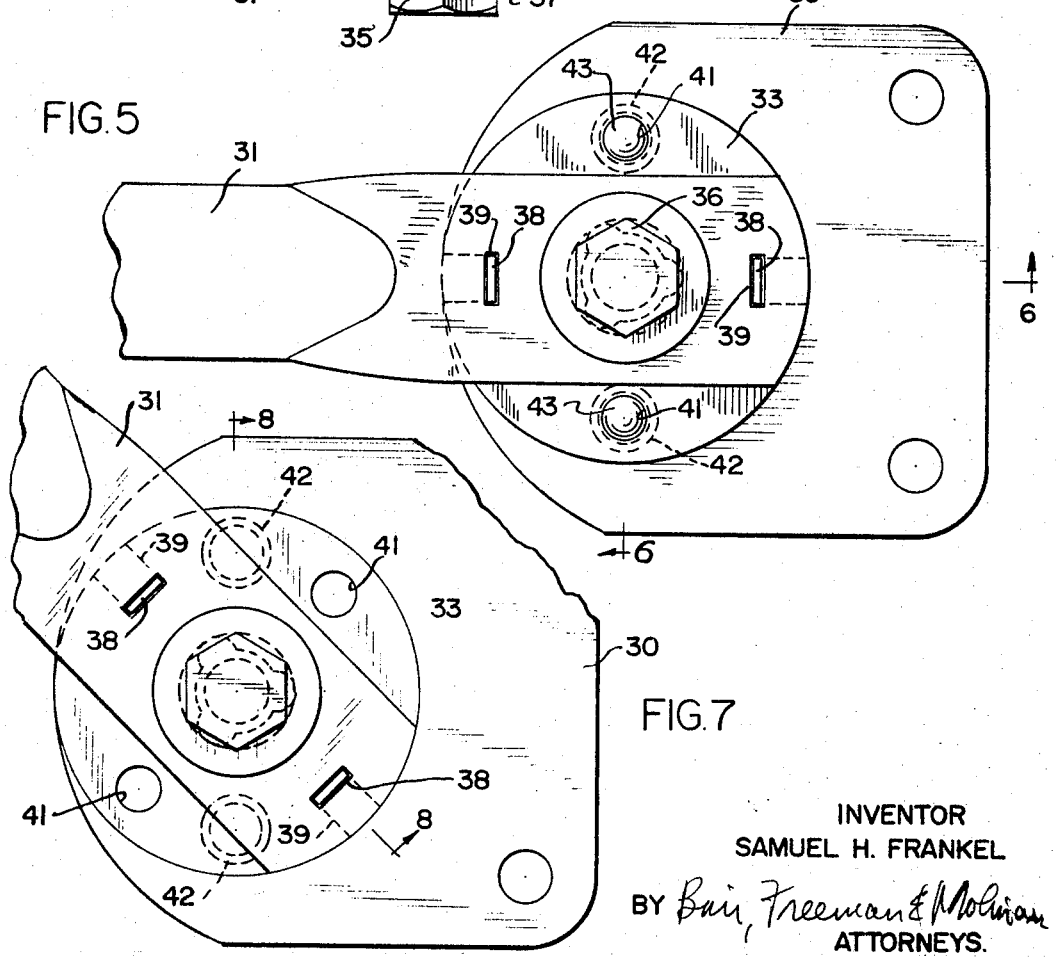

United States Patent Office 3,433,511
Patented Mar. 18, 1969

3,433,511
JOINT FOR OUTSIDE REAR VIEW MIRRORS
Samuel H. Frankel, Skokie, Ill., assignor to Allen Electric and Equipment Company, Kalamazoo, Mich.
Filed Nov. 21, 1966, Ser. No. 595,877
U.S. Cl. 287—14      6 Claims
Int. Cl. F16c *11/00;* B25g *3/38*

ABSTRACT OF THE DISCLOSURE

A hinged joint is provided for an outside rear view mirror for an automotive-type vehicle. The joint is provided with a preselected dwell position which holds the mirror at a preselected attitude. Means are provided to hold the mirror in out-of-use positions but with lesser resistance than in the dwell position. A simplified construction is obtained by using a spring plate that defines therein the dwell position and serves as a bias means when the mirror is in the out-of-use positions.

---

This invention relates to a joint for outside rear view mirrors and more particularly to a hinged joint for mounting such mirrors on trucks, buses and similar vehicles.

A hinged joint for an outside rear view mirror is provided by arrangement of two spaced frame members arranged on a pivot with a resilient plate spaced between the two members and locked against pivoting to one of the two members. The resilient plate has dwells adapted to receive cam-surfaced lock elements carried by the other member. When the lock element is displaced from a dwell, the resilient plate is flexed and provides frictional engagement with the lock elements to hold the parts in their displaced position.

In mounting rear view mirrors on relatively large vehicles, such as trucks, buses and the like, it is customary to secure a framework to the side or sides of the vehicle extending outwardly therefrom and to pivot to that framework on a vertical axis a second framework which carries the rear view mirror. When the rear view mirror is swung out of its adjusted position for use, either intentionally to get it out of the way or accidentally upon striking some obstruction, it is desirable that some means be provided to return the mirror supporting framework accurately to its proper adjusted position. The hinged joint constructions heretofore provided for this purpose have been relatively complicated and in some cases have used floating cam plates which are not entirely satisfactory.

It is accordingly an object of the present invention to provide a joint for rear view mirrors which is relatively simple in construction, which will yield to permit the mirror supporting frame to be turned out of its adjusted position without damage thereto, and which will accurately return the mirror supporting frame to its adjusted position.

According to a feature of the invention the mirror supporting frame is held in adjusted position by yielding means which will yield only to a relatively high degree of force and is yieldingly held in its position when turned from its adjusted position with a relatively lesser degree of force.

The above and other objects and features of the invention will be more readily apparent from the following description when read in connection with the accompanying drawings wherein:

FIG. 1 is a partial top plan view of a hinged joint embodying the invention;

FIG. 2 is a section on the line 2—2 of FIG. 1;

FIG. 3 is a partial view similar to FIG. 1 showing the parts turned out of their normal use position;

FIG. 4 is a section on the line 4—4 of FIG. 3;

FIG. 5 is a view similar to FIG. 1 of an alternative construction;

FIG. 6 is a section on the line 6—6 of FIG. 5;

FIG. 7 is a view similar to FIG. 5 with the parts turned out of their normal operative position; and FIG. 8 is a section on the line 8—8 of FIG. 7.

Referring first to FIGS. 1 and 2 the joint structure shown therein comprises a pair of frame members 10 and 11 which are adapted to be attached respectively to a supporting structure such as a vehicle body and a mirror to support the mirror. The mirror may be connected to the frame member which supports it through a pivot joint on a vertical axis so that the angle of the mirror can be adjusted relative to its supporting frame and can be securely locked in position on its supporting frame as is understood in the art. Preferably one of the frame members, shown as the frame member 11, is connected to a supporting arm or bracket 12 through a slip joint by means of which the spacing of the mirror beyond the side of the vehicle can be adjusted. As shown the frame member 11 is formed with an elongated slot therein to register with a corresponding opening in the support member 12 and a bolt 13 extends through the slot and opening to secure the frame member and support member together in adjusted position.

The frame member 10 is formed adjacent to one end thereof with a circular opening therethrough and an annular spacer which may be a steel washer overlies the frame member with the opening therein registering with the opening in the frame member. The spacer supports a locking plate element 15 in spaced relation to the frame member 10 and generally parallel thereto as shown. The plate element is held against rotation relative to the frame member 10 by forming a notch 16 in the periphery of the plate element which receives a bent up tongue 16' on the end of the frame member.

The second frame member 11 has rigidly secured thereto a tubular ferrule 17 which extends through the aligned openings in the plate member 15, the washer-like spacer 14 and the frame member 10. As shown, the ferrule is thinned in section at its upper end to provide a thin walled portion which will extend through an opening in the end of the frame member 11 and which is then swaged or peened over to secure the ferrule rigidly to the frame member 11. Preferably a spacer or washer 18 is inserted between the frame member 11 and the plate element 15.

The frame member 11 also carries at points on diametrically opposite sides of the ferrule a pair of cam lock elements 19. The lock elements 19 may be in the form of rivets having partially circular hardened heads and whose shanks extend through openings in the frame member 11 and are then riveted over to secure them rigidly to the frame member.

The lock elements 19 are adapted to cooperate with dwells or recesses formed in the plate element 15. As shown the plate element 15 is partially punched out as indicated at 21 at points preferably on diametrically opposite sides of the ferrule, or at an arcuate spacing of 180 degrees, to form recesses into which the lock elements 19 may fit and with planar surfaces extending to each side between the recesses. When the joint is in its normal operative position as shown in FIG. 1, the two lock elements enter the dwells or recesses and hold the frame members in the desired aligned position.

The several parts are held assembled by a bolt 22 which extends through a washer 23 and a friction washer 24 and through the ferrule 17 to receive a nut 25. With the parts assembled as shown and with the bolt and nut in place the plate element 15 is secured against displacement toward or away from the frame member 10 and is also held against rotation relative to the frame member 10.

It will be noted that the plate element 15 extends substantially beyond the spacer 14 so that its edge constitutes in effect a cantilever portion. The plate element 15 is also relatively thin and is formed of steel or the like so that it is relatively resilient.

When the mirror is in its normal position of use, the lock elements 19 will enter the dwells 21 in the plate element 15 and will hold the frame members resiliently in the aligned position desired. However, when a sufficiently large force is applied to the mirror tending to turn it, either intentionally or accidentally, the lock elements will cam themselves out of the dwells and will bear against the planar surface located between dwells to deflect the cantilever edge portion of the plate element 15 downwardly as shown in FIGURE 4. At this time, the frame elements 10 and 11 can be turned relative to each other about the axis of the ferrule 17 without damaging any of the parts. The frame members will be yieldingly held in their turned position by the friction exerted on the upper surface of the plate element 15 by the lock elements 19 and also by the friction effect of the friction washer 24. However, when it is desired to return the mirror to its position of use, it can easily be swung about the axis of the ferrule 17 until the lock elements 19 again enter the dwells to hold the mirror accurately in its use position. It will thus be seen that each time the mirror is displaced from its position of use, it can be returned easily and with a high degree of accuracy to the use position desired.

The embodiment shown in FIGURES 5–8 comprises first and second frame members 30 and 31 which correspond generally to the frame members 10 and 11 of FIGURES 1 and 2. The first frame member 30 is formed near one end with an opening into which one end of a spacer sleeve 32 is secured as by riveting in substantially the same manner as the ferrule 17 is secured to the frame member 11. Adjacent to its opposite end the spacer sleeve 32 rotatably supports a plate member 33 in spaced relationship to the frame member 30. The plate element 33 is rotatably mounted on a reduced lower end portion of the spacer sleeve and is held thereon by a washer 34 and by peening over the end of the spacer sleeve below the washer as shown.

The second frame element 31 is formed near its end with an opening to receive a bolt 35 which extends through the spacer sleeve and which is secured by a nut 36. A washer 37 is preferably positioned between the head of the bolt 35 and the frame member 31 to support the frame member on the bolt for pivotal turning about the axis thereof. The plate element 33 is also connected to the frame member 31 to prevent relative rotation therebetween. For this purpose the plate 33 may have tangs 38 bent out therefrom at diametrically opposite sides which tangs extend through openings 39 in the frame member 31.

The plate element 33 is also formed at diametrically opposite sides with openings 41 therein. To cooperate with the openings the frame member 30 carries spring detents which as shown comprise sleeves 42 secured to the frame member 30 and projecting downwardly therefrom into proximity to the plate element 33. A detent 43 shown as a spherical ball is slidable in each of the sleeves 42 and a spring 44 in the sleeve tends to press the ball 43 outward therefrom into engagement with the plate element 33.

When the frame members are aligned to position the mirror for use the detents 43 will be in registration with the opening 41 in the plate element and will partially enter the openings to hold the frame members resiliently in the desired adjusted position. When a sufficiently large force is applied to the mirror to move it out of adjusted position for use, the detents will cam out of the openings and will ride over the surface of the plate element, being pressed against it by the springs 44. This will create a relatively light frictional force, tending to hold the frame elements in whatever position they may then occupy. However, when it is desired to return the mirror to its position of use it can easily be turned about the axis of the bolt 35 until the detents 43 again drop into the openings 41. At this time the mirror will be accurately positioned and will be held in the desired adjusted position during all normal conditions of use.

While two embodiments of the invention have been shown and described in detail, it will be understood that these are illustrative only and are not to be taken as a definition of the scope of the invention, reference being had for this purpose to the appended claims.

I claim:

1. An improved hinged joint for an outside rear view mirror or the like wherein one frame member is adapted to be rigidly secured to the body of a vehicle while another frame member carries the mirror that is removable relative to the body of the vehicle; said hinged joint comprising, in combination, a sandwich arrangement of an apertured first frame member, an apertured plate element and an annular spacer between the first frame member and plate element to secure against displacement therebetween, the plate element extending radially outwardly of the spacer to provide a cantilevered portion that has at least one aperture means defined therein through said cantilevered portion and at least 180° of planar surfaces to each side of said aperture means, means securing the first member, the spacer and the plate elements together against separation; an elongated pivot in said sandwich arrangement; a second frame member mounted on said pivot, the second frame member being spaced from said sandwich so that the plate element is spaced between said first and second frame members, positive interlocking means operatively associated with the plate element and one of the frame members to prevent relative rotation therebetween about the pivot, and to force said plate and said one member to move relatively to the pivot in unison, the aperture means in the cantilevered portion of the plate constituting a dwell defined on the plate element spaced outwardly from the axis of the pivot, a cam-surfaced lock element carried by the other frame member at substantially the same radial spacing outwardly from the axis of the pivot as the radial spacing of the dwell on the plate element, one of said elements located outwardly of the spacer being resiliently movable lengthwise of the pivot, so that when the lock element and dwell are in a first position of alignment, the lock element enters and is held by said dwell in said first position, and when the lock element is in a second position out of alignment with the dwell it bears against the planar surface of said plate element to create a spring bias force which tends to hold the lock element and second frame member in said second position.

2. A hinged joint as in claim 1 which the cantilevered portion of the plate element which extends outwardly of the spacer provides a flexible edge portion in which the dwell is formed and which is biased by the lock element toward said one of the frame members when the lock element is in said second position.

3. A hinged joint as in claim 1 in which the second frame member is secured to a tubular ferrule which extends rotatably through openings in the first frame member, the spacer and the plate element and in which a fastening extends through the ferrule to connect the parts together.

4. A hinged joint as in claim 1 in which the lock element comprises a sleeve carried by said other frame member extending toward the plate element, a detent movable in the sleeve, and a spring in the sleeve urging the detent toward the plate element.

5. A hinged joint as in claim 1 in which the spacer is a tubular ferrule secured at one end to the first frame member and having the plate element rotatably mounted on its other end and in which the second frame member is pivotal on a fastening extending through the ferrule.

6. A hinged joint as in claim 1 including an elongated tubular ferrule having secured thereto the second of the two frame members; both the plate and the first frame member being arranged to permit relative pivoting between it and the ferrule; and a portion of one of the pair of elements consisting of said plate and first frame member defining a tongue which enters a recess defined in the other of the pair of elements to interengage said elements and prevent relative rotation between said pair of elements about said ferrule.

References Cited

UNITED STATES PATENTS

| 2,692,784 | 10/1954 | McRae | 287—99 |
| 3,119,591 | 1/1964 | Malecki | 287—101 |

FOREIGN PATENTS

| 1,406,689 | 6/1965 | France. |

EDWARD C. ALLEN, *Primary Examiner.*

D. W. AROLA, *Assistant Examiner.*

U.S. Cl. X.R.

287—101